Jan. 9, 1934.     J. J. GOUGH     1,943,270
SHADED POLE INDUCTION MOTOR
Filed June 2, 1933     2 Sheets-Sheet 1
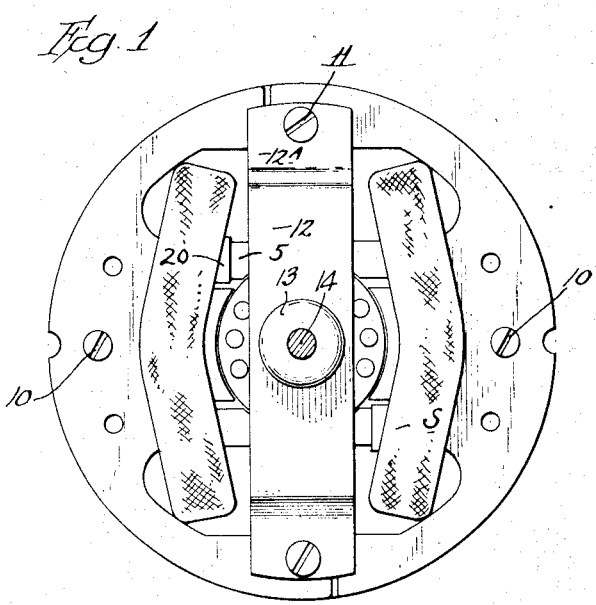
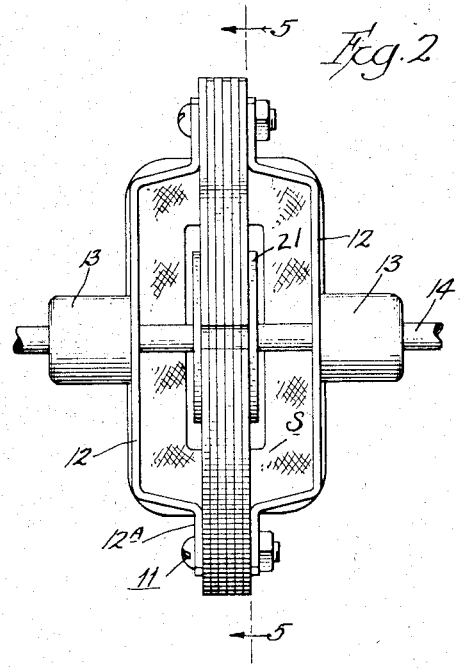
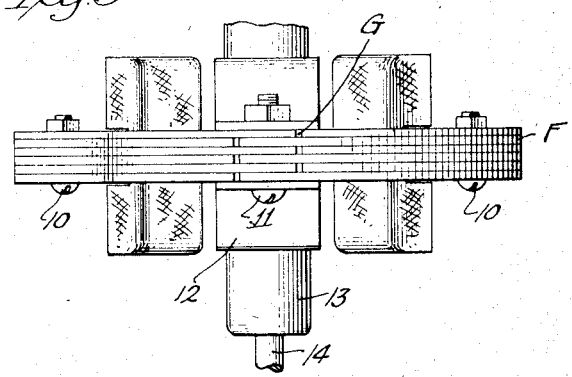
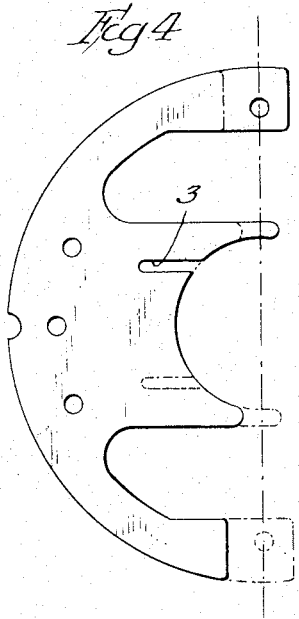
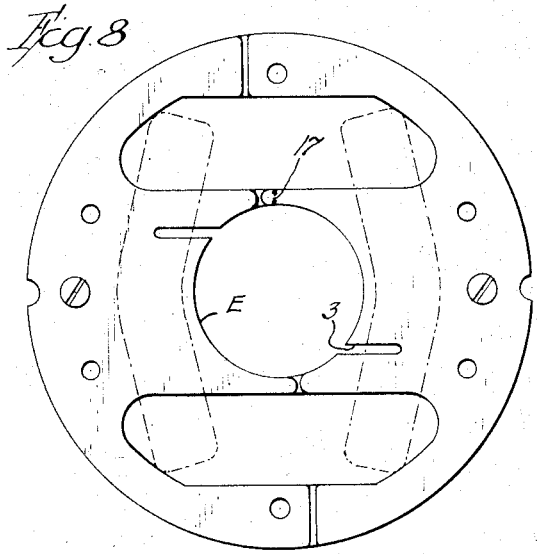
Inventor:
James J. Gough
by Albert Scheible
Attorney

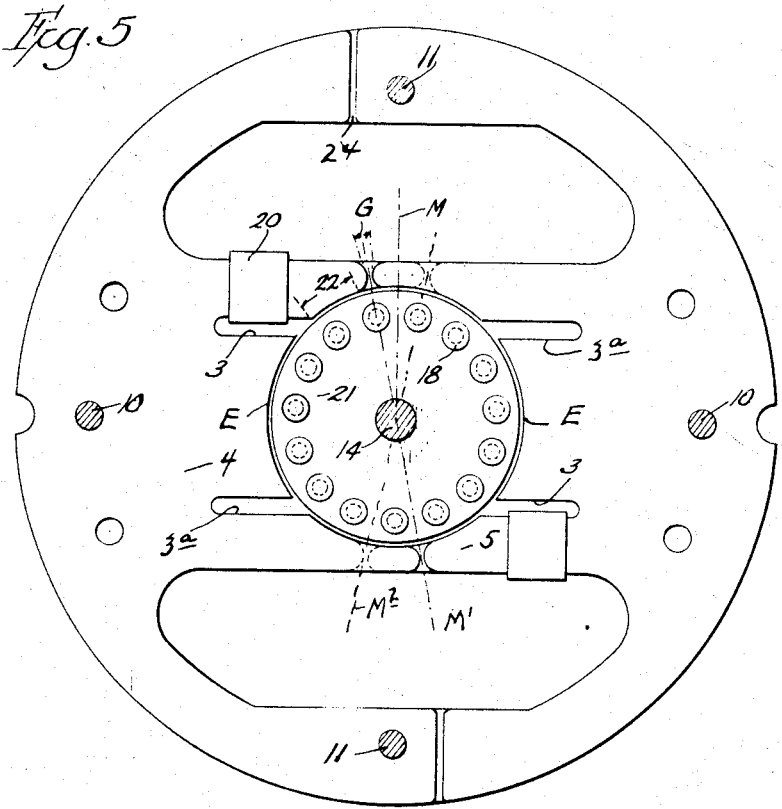
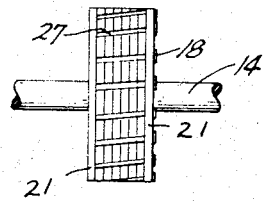
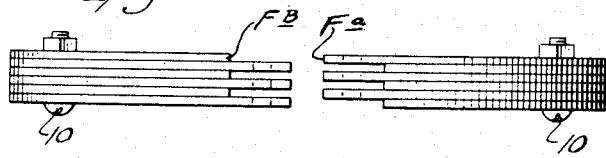
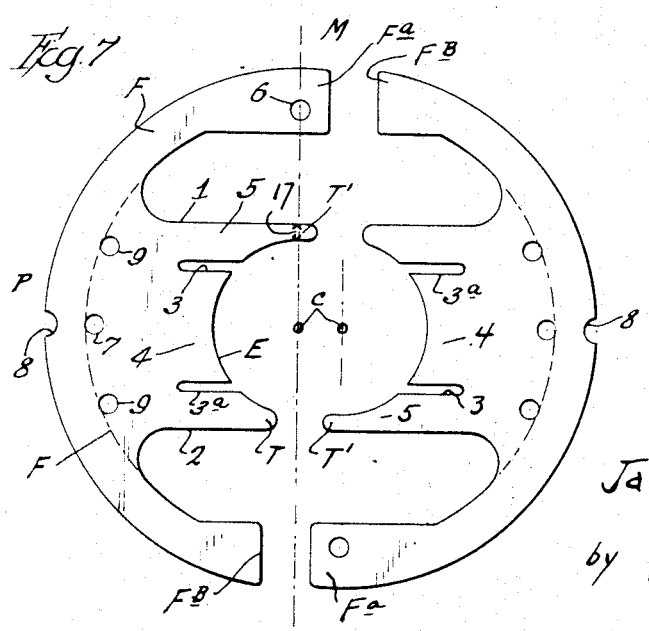

Patented Jan. 9, 1934

1,943,270

UNITED STATES PATENT OFFICE 1,943,270

SHADED-POLE INDUCTION MOTOR

James J. Gough, Chicago, Ill., assignor to Chicago Electric Manufacturing Company, Chicago, Ill., a corporation of Illinois Application June 2, 1933. Serial No. 673,987

11 Claims. (Cl. 172—278)

My invention relates to the class of bipolar induction motors in which the stator core has a shaded pole-tooth of each pole-piece connected by a magnetic bridge to an unshaded pole-tooth of the other pole piece.

Generally speaking, the objects of my invention are those of increasing the efficiency of a motor of this class, improving the synchronous stability of the motor, facilitating the assembly of the motor, and reducing both the cost and weight of the motor in proportion to its power output with current supplied at a given voltage.

More particularly, my invention aims to provide a stator for a motor of the aforesaid class, which will include the following advantageous features in effectively cooperating relation to each other:

(1) A stator core of the inner pole type in which salient poles extend towards each other from diametrically opposite portions of a frame, which type has low magnetic leakage and disposes the armature centrally of the stator so as to permit the use of a compact motor casing coaxial with the armature.

(2) A stator core composed of cheaply punched and counterpart laminations, and constructed so as to permit a convenient mounting of pre-wound stator coils and of shading rings on its pole-pieces.

(3) A stator core including magnetic bridges connecting the two pole-pieces at opposite sides of the armature for increasing the proportion of the periphery of the armature which is directly influenced by magnetic flux.

(4) Stator core laminations affording such magnetic bridges between the opposite pole-pieces and adapted to be assembled without employing fastening elements extending through these bridge portions, thereby permitting these bridge portions to be of quite small thickness (radially of the rotor) so as to reduce the magnetic flux through them.

(5) A stator core composed of two counterpart half-core lamination assemblies and presenting reluctance gaps spaced rotationally of the core from the median (mechanical) plane between the two pole-pieces of the core.

(6) A shaping and assembling of the stator core laminations which will permit the laminations for each half of the stator core to be cheaply and expeditiously assembled separately and thereafter secured to each other.

(7) A squirrel-cage rotor having its rotor bars so spaced as to co-operate with the spacing between sets of such reluctance for reducing any tendency toward having the rotor lock.

(8) A proportioning of the shaded tooth to the unshaded tooth of each pole-piece affording a decided increase in efficiency in comparison with the usual equality in size of these teeth, and which will cooperate with the reluctance of the magnetic bridges for securing an increased power output from a stator of given dimensions when used with a given rotor, without increasing the power factor.

Illustrative of the manner in which I accomplish the above recited objects,

Fig. 1 is a front elevation of a stator, rotor and motor assembly for a fan motor, constructed according to my invention.

Fig. 2 is a side elevation of the same, with the nearer stator coil omitted.

Fig. 3 is a plan view of the same assembly.

Fig. 4 is an elevation of one lamination-half for a stator core construction which omits the idle pole-piece slot shown in Figs. 1, 5 and 8, with dotted lines showing the changes in the alternate lamination-halves.

Fig. 5 is an enlarged vertical section taken along the line 5—5 of Fig. 2.

Fig. 6 is a plan view of the two lamination-half assemblies before they are connected to each other.

Fig. 7 is an elevation of two counterpart halves of a stator core lamination, spaced apart.

Fig. 8 is a view similar to Fig. 5, but drawn on a smaller scale, showing a stator core allied to that of Fig. 5 but with only a single slot in each pole-piece.

Fig. 9 is a side elevation of the rotor of the motor.

With two-pole stator cores for small motors of the class recited in the opening paragraph of my specification, it has heretofore been generally customary to provide each pole-piece with a medial longitudinal slot which divides it into two equal pole teeth, one of which is surrounded by a shading coil of copper or other non-magnetic material. Owing to this equality of the pole teeth of each pole, one half of the part of the armature part which is opposite a pole-piece at any given moment has a considerably lower magnetic flux passing through it than the other half, thereby undesirably reducing the voltage induced in the rotor bars moving across this magnetic flux.

To overcome this, it has heretofore been proposed to provide each shaded pole tooth with an auxiliary winding to supplement the usual stator coil, but this undesirably increases the manufacturing cost of the motor. It has also been proposed to space the two teeth of each pole-piece unequally from the armature, but such an increase in the radial gap between the armature and any part of the pole-pieces increases the power factor so as to reduce the efficiency of the motor.

In contrast with these previously employed expedients, I shade only a quite minor fraction of the width of each pole-piece, namely not more than a quarter of the width of this pole-piece at right angles to a plane axial of the armature and medial of both of the pole-pieces, so that the magnetic flux between the armature and by far the greater portion of each pole-piece is undiminished by any shading effect.

Then I connect each shaded pole tooth to the much larger unshaded pole tooth of the opposite pole-piece by a connecting bridge, which bridge has the width of its mid-length portion a minor fraction of the thickness of the shaded pole tooth, and which bridge also has its magnetic reluctance further reduced by two sets of air gaps, spaced rotationally of the stator from the (mechanical) median plane between the two pole-pieces. With this in mind, I employ two sets of iron half-lamination punchings for my stator core, each of which sets forms half of the stator core and all of which punchings may be counterparts of one another, and I form these punchings so as to permit a convenient mounting of a pre-wound stator coil on each set before the two sets are fastened to each other. I also form the inner faces of all pole-teeth and of the magnetic bridges as parts of a common cylindrical surface, so as to provide an air gap of entirely uniform width around the armature except at the slots which subdivide the pole-pieces into pole-teeth.

As here illustrated, my stator core when comprising two such sets of lamination punchings comprises an outer frame and a cross-bar extending diametrically across the frame, the cross-bar having a central cross-bore which divides it into two opposed pole-pieces, and each of these pole-pieces being slotted to divide it into a main pole-tooth and a much smaller second pole-tooth. To permit a rigid fastening of the two stator core halves to each other while still allowing the pole-connecting magnetic bridges to be of quite small width radially of the armature with which this core is employed, and to permit a single form of punching to be used for all parts of the stator core, I desirably employ stator laminations all formed as shown in Fig. 4.

Each such half-lamination punching (as shown in Fig. 7) comprises a half-annular frame portion F having a substantially semi-cylindrical outer edge, and having a salient pole-piece projecting inwardly of its half-annular frame portion from the said frame. This pole-piece has its side edges 1 and 2 parallel to and equally spaced from a plane P longitudinal of the pole-piece and at right angles to the face of the punching, and the pole-piece has its free end E concaved as part of a cylindrical surface about an axis C lying in the plane P, namely the axis of the outer edge of the frame.

Extending into the pole-piece from its free end and parallel to the said plane P is a slot 3 which divides the pole-piece into a major pole-tooth 4 and a minor pole-tooth 5, the slot being so disposed that the width of the minor pole-tooth is not over one-fourth and desirably only about one-fifth that of the major pole-tooth, and the width of the slot 3 being a minor fraction of the width of the minor pole tooth. To permit the hereafter described alternate inverting of the superposed half-laminations, I also provide each major pole-tooth 4 with an idle slot 3a symmetrical with the slot 3 in relation to the mid-plane P of the pole-piece.

The end $F^a$ of the half-annular frame portion F of the punching adjacent to the minor pole-tooth projects beyond a plane M taken at right angles to the face of the punching and to the aforesaid plane P through the said curvature axis C, and this projecting end has a bolt-receiving perforation 6. The other end $F^b$ of the frame portion of the punching terminates short of the plane M by a distance approximating that to which the perforated frame end $F^a$ projects beyond this plane.

The minor pole-tooth 5 presents a tip $T^1$ adjacent to its side edge 1 and projecting beyond the plane M which is the mechanically medial plane between the two pole-teeth in the assembled motor, while the major pole 4 has the tip portion T adjacent to its side edge 2 freely spaced from the said plane. The half-lamination also has an auxiliary perforation 7, desirably near the outer edge of its frame portion and along the plane P, for receiving a lamination-assembling bolt; and two perforations 9 through which guide-pins can extend for alining the lamination punchings before they are clamped together by bolts extending through the perforations 7 in superposed punching.

In assembling the stator core, the laminations for each half of the core are superposed and alined, with the laminations alternately inverted, as shown in Figs. 3 and 8, and clamped together by a bolt 10 which desirably extends through the midlength parts of the half-annular frame portions and adjacent to the outer edges of these frame portions. Then a copper shading ring R is slid over one of the minor pole-teeth, and a stator coil S over the entire pole-piece. Two such half-assemblies then are slid toward each other and are clamped together by bolts 11 which extend through the frame end perforations 6 and which bolts desirably also extend through the feet 12A of brackets 12 carrying bearings 13 in which the shaft 14 of the armature is journaled.

With the parts proportioned as in Figs. 1 to 5, the shading ring 20 surrounds only about one-fifth of the width of the entire pole-piece; and this shading ring reduces the magnetic flux to and from the armature 21 only in the minor pole-tooth 5, which is only about one-fifth the total width of the pole-piece instead of being half of the total width as in the previously common constructions of bi-polar stator cores in which each pole-piece has its shaded pole-tooth connected by a magnetic bridge to an unshaded pole-tooth of the other pole-piece.

Moreover, by making my bolt connections through the ends of the frame-half portions of the laminations, instead of bolting through parts of the pole pieces as heretofore proposed, I require no mechanical strength in the tips T and $T^1$ of the pole-teeth. Consequently, I can greatly reduce the width of each of these pole tips as shown in Fig. 7 to only about one-tenth of the total width of each pole-piece, thereby greatly reducing the amount of magnetic flux from each unshaded pole-tooth to the shaded pole-tooth of opposite polarity.

Moreover, the gaps G (Fig. 3) between the pole-tooth tips of each two lamination halves also increase the magnetic reluctance, thereby further reducing the just mentioned magnetic flux. And, with the face of each pole-piece forming part of a cylindrical surface concentric with the axis of the armature, I can secure the previously recited effect without increasing the air gap between the armature and any portion of the faces of the pole-pieces beyond the minimum required for mechanical clearance, and hence without disadvantageously affecting the power factor of the motor. As the result, I have that a motor equipped with my heretofore described stator affords much greater torque and hence power than when provided with a stator core formed from the same initial punchings but having one-half of each pole-piece shaded in the heretofore customary manner.

With these two pairs of bolts at right angles to each other, and with the bracket-feet 12A overlapping the gaps 24 which may be permitted between the frame-end tips of the halves of each lamination to allow for any manufacturing irregularities, I enable the bolts 10 and 16 to clamp the laminations tightly into a rigid assemblage in which the opposed ends E of the pole-pieces form part of a common cylindrical surface, and particularly so when the edge tips T and T¹ bridging extensions on the two pole-pieces interlock in a mortise and tenon joint.

By thus eliminating the hertofore customary use of fastening elements extending through the stator at or near the mechanical median plane M, I am able to reduce the minimum width 17 of each magnetic bridge between the two opposite pole-pieces to a much smaller size than has heretofore been possible, so that the small cross-section of each such bridge at this point also cooperates with the said reluctance gaps G in throttling the magnetic flux from each unshaded pole to the shaded pole.

With the heretofore described stator, I desirably employ a squirrel-cage armature including an iron core 27 having a cylindrical contour which requires only a slight clearance from the pole-piece end faces E when the armature is coaxial with the curvature of these faces, and including core rotor bars 18 which connect the usual copper rings 21 at opposite ends of the core 27 and which bars desirably are skewed as shown in Fig. 9. Moreover, I make the rotor bars of such a number and spacing as to cooperate in an unusually efficient manner with the relative widths of the two teeth of each pole-piece and with the positions and spacings of the two sets of reluctance gaps G by proceeding as follows:

First, I use an uneven number of equally spaced rotor bars (shown in Figs. 5 and 15), so that no two of these bars 18 can be simultaneously opposite the slots 3 through which the shading rings 20 respectively extend. Next, I adopt such an odd number of rotor bars that the spacing between the axes of two consecutive bars will approximately equal the spacing between the two sets of air gaps or reluctance gaps G, so as to bring two adjacent bars 18 respectively opposite the two sets of reluctance gaps G in one magnetic bridge when the single such bar is opposite the bridge portion between the two sets of gaps in the other magnetic bridge, as shown in Fig. 5. By also proportioning the circumference 22 of the arcuate face of each minor pole-tooth up to the nearest gap G to approximately the spacing between the said two sets of reluctance gaps, as shown in Fig. 5, I cause two rotor bars to be disposed opposite one minor pole-piece while a single such bar is squarely opposite the other minor pole-piece.

With this proportioning of my stator core to the rotor bar spacing, and with these bars of an odd number, any so-called "fringe flux" or enhanced magnetic flux at any gap in the stator core, which would tend to exert a locking effect on the rotor at one side of the latter, is effectively offset by the absence of a similar effect at the opposite side of the rotor. In addition, my experiments seem to indicate that with the here illustrated and described proportioning, the medial magnetic plane between the two pole-pieces shifts (when the motor is running) from the mechanical medial plane M to a plane 20 extending approximately through one set of the reluctance gaps G at each side of the rotor, so that this disposing of one set of the said gaps at the magnetic medial plane still further reduces any tendency toward producing such magnetic fringe fluxes.

With my above described motor, both the shading coil 20 and the stator coil S are easily and quickly attached to each stator core half before the two stator halves are bolted to each other, and the output of the motor can readily be increased (without altering the half-lamination punchings) by merely increasing the number or thickness of these punchings and correspondingly lengthening the armature. And, regardless of the extent to which the stator and the armature are thus lengthened, my motor has shown an unusually high power output in proportion to its size, and particularly in comparison to motors in which the two pole-teeth of each pole-piece are of equal width.

While I am not as yet able to state the theoretical or mathematical reasons accounting for all of the advantages which I secured by my here disclosed motor construction, I believe these to be due partly to my practically annulling the action of so called "fringe fluxes," to my effectively throttling the magnetic flux through the magnetic bridge in the heretofore described manner, to my disposing the rotor so that almost its entire periphery is within magnetic flux from the stator, and to the relatively quite small size of the minor pole-teeth in comparison to that of the major pole-teeth.

Referring to the last point, my experiments have shown that with a given armature and with all other parts arranged as above except for variations in the relative widths of the major and minor pole-teeth, the output of the motor (with current supplied at a given voltage) increases steadily when the shaded pole-tooth is decreased in width (in comparison with that of the unshaded pole-tooth) until the shaded pole-tooth is approximately from one-fourth to one-fifth that of the unshaded tooth, but that a still greater reducing of the proportionate size of the shaded tooth is deleterious.

As a rough check on the advantage obtained by my experimentally determined change of the relative pole-tooth sizes in a motor which has its pole-pieces magnetically bridged, I have made the following test: Two electric fans were set on a table squarely facing each other, with a thin aluminum sheet suspended between them, and pivoted at its upper edge on a horizontal axis. One of these fans had a motor constructed just as heretofore described, and the other differed only in having the two teeth of each pole-piece of equal width.

When the two fans were connected to the same circuit, the suspended sheet was deflected far toward the one with the equal pole-teeth when the fans were equally distant from the sheet, and the fan with the here disclosed motor had to be placed about two and one-fourths times as far from the sheet as the one with the equal pole-teeth before the sheet would depend vertically thus demonstrating the enormous increase in power due to my departure from the heretofore customary equal size of the bridge-connected shaded and unshaded pole-teeth in such a motor.

In line with the above experiment, I have found that with a stator core of given interior and exterior diameter, my change in the pole-teeth proportioning allows the motor to be built for a given power output with less than half a total thickness of the stator core than that required with the pole-teeth of equal size. This reduction in the thickness of the stator core also means a corresponding reduction in the length of the rotor and the size of the motor casing, so that my invention effects a decided reduction in the cost as well as shipping weight of the motor.

When the stator core of my motor is to have all lamination punchings duplicates of each other, so that only a single blanking die is required, an auxiliary but idle slot 3a is required in order that the punchings may alternately be relatively inverted. However, instead of thus having all of the lamination punchings interchangeable, I may employ two types of punchings, each having only a single pole-dividing slot 3, as shown respectively in full and in dotted lines in Fig. 4. These differ in having this slot near the longer end F$^a$ of the frame in one punching and nearer the shorter frame end F$^b$ of the frame in the other punching, so that the slots in the two types of punchings will aline when they are superposed in alternately inverted disposition.

Theoretically, only the single operative slot 3 as shown in Figs. 4 and 5 should be needed, but my experiments have indicated that a closing of the idle slots 3a in the stator core of Figs. 1 and 5 makes too trifling a difference in the output of a motor (when of the table fan type here shown in actual size) as to offset the cost of the extra die.

Moreover, by providing two such slots in each half-lamination punching, I can also use exactly the same punchings when the armature is to rotate in the opposite direction from that of Fig. 1, by placing the shading rings 20 on the small pole-piece portions between the slots 3a and the adjacent side edge of the pole-piece and leaving the slots 3 idle.

With both of the illustrated types, it will be noted from Figs. 7 and 8 that each of the relatively reversed two punchings forming a single lamination is of the general shape of a letter E in which the mid-height presents a semi-circular free end projecting further at one edge of its curvature than at its other end; and that the top and bottom bars of the letter E configuration also differ in length, with the longer bar adjacent to the further projecting edge of the free end of the mid-height bar.

Moreover, while I have pictured my stator core as of the cylindrical contour which easily permits a casing of circular section to be fitted over it, I do not wish to be limited to this or other details of the construction and arrangement here disclosed, as many changes could obviously be made without departing either from the spirit of my invention or from the appended claims. Nor do I wish to be limited to the conjoint use of all features of my here presented invention, or to its use for small motors, although it has proven particularly advantageous in connection with small electric fans and household electric devices.

I claim as my invention:

1. In a stator core, two counterpart and relatively reversed core-halves, each comprising a semi-annular frame portion and a salient portion extending radially inward of the said frame portion from the midlength of the latter; the said salient portion having its free end concaved approximately as a semi-cylindrical surface about an axis at right angles to the general plane of the said frame portion; the adjacent ends of the two frame portions of the two core-halves as well as the adjacent ends of the two salient portions presenting interengaging mortise and tenon formations; and fastening means connecting the two core-halves, the fastening means being spaced from the salient portions of both halves.

2. A stator core comprising two core-halves as per claim 1, in which the fastening means comprise two members each connecting a frame end portion of one core-half with the adjacent frame end portion of the other core-half and extending only through tenons on the two core-halves.

3. A stator core as per claim 1, in which the said fastening means are arranged for holding the two core halves with their salient portions in longitudinal alinement and with the interengaging ends of the two salient portions presenting two sets of air gaps spaced longitudinally of the said salient portions.

4. In a stator core, two counterpart and relatively reversed core-halves, each comprising a semi-annular frame portion and a salient portion extending inwardly of the said frame portion from approximately the middle of the latter, the said salient portion having its free end formed approximately as a semi-cylindrical surface, the salient portions of the two core-halves having the parts adjacent to the ends of their said semi-circular formations in relatively interengaging mortise and tenon formations with the free end of each tenon on a salient portion of one core-half being freely spaced from the part of the salient portion of the other core-half which faces that free end, and the said free end of each tenon part of a salient portion being substantially semi-cylindrical so as to avoid fringe fluxes.

5. In a stator core, two counterpart, relatively laterally reversed and inverted core-halves; each core-half comprising a semi-annular frame portion and a salient portion extending radially inward of the said frame portion from the midlength of the latter, the said salient portion of each core-half having its free end concaved approximately as a semi-cylindrical surface about an axis at right angles to the general plane of the said frame portion, the salient portions of the two core-halves having the parts adjacent to opposite edges of their said concaved ends interlapping to afford magnetic bridges between the said salient portions; and means fastening the two core-halves to each other with the two ends of the frame portion of one core-half presenting parts thereof in overlapping relation respectively to parts of the two ends of the frame portion of the other core-half.

6. A laminated stator core comprising flat iron punchings each of which forms one-half of a lamination; each punching comprising a semi-annular frame portion, and a relatively wider salient pole-piece portion extending from a medial part of the frame portion toward the axis of curvature of the frame portion, the pole-piece portion having its free end concaved concentric with the said axis to present two edge tips, and the pole-piece portion having a longitudinal slot extending into it from its said free end; the punching being so formed that a plane along the said axis and at right angles to the longitudinal walls of the said slot intersects one end part of the semi-annular frame portion and also intersects one of the said edge tips, and so that the other end part of the semi-annular frame portion and the other edge tip terminate short of the said plane.

7. A stator core comprising superposed and consecutively relatively inverted laminations, each lamination consisting of two relatively inverted punchings of substantially figure E shape disposed with the free ends of their mid-height bars of the said figure adjacent to each other and having these tips concaved toward each other; and fastening means associated with the free ends of the top and bottom bars respectively of the said figure E-shaped lamination punchings for securing all of the punchings to one another with a tip portion of the mid-height bar of each punching freely spaced from the tip of the mid-height bar of the other punching of the same lamination but in flatwise contact with a tip portion on which the said other punching is superposed.

8. A stator core as per claim 7, in which each E-shaped punching has one of its end bars longer than the other bar and in which the fastening means extend only through the longer end bars of the punchings.

9. In an alternating current motor having a horizontal shaft, a stator core comprising superposed laminations, each lamination consisting of two relatively laterally reversed and inverted punchings of substantially a letter E shape having the ends of their mid-height bars concaved toward each other, and four fastening means conjointly clamping the laminations into relatively reversed core-half assemblages and holding the mid-height bars of all laminations in axial alinement; the said fastening means comprising two fastening means extending respectively through the adjacent ends of the upper and the lower bars of all of the said punchings, and two fastening means respectively adjacent to opposite side edges of the mid-height portions of the stator core.

10. In an alternating current motor, a stator core presenting two opposed and axially alined pole pieces, each comprising a major and a minor pole-tooth respectively disposed at opposite edges of the pole-piece; two magnetic bridges each connecting a major pole-tooth of one pole-piece with a minor pole-tooth of the other pole-piece; means for magnetically energizing each pole-piece and for shading each minor pole-piece; and a squirrel-cage rotor conjointly housed by the adjacent ends of the two pole-pieces and the two bridges, the rotor having uniformly spaced rotor bars; each bridge having reluctance gaps spaced, by approximately the consecutive spacing of the axes of the rotor bars, from the mechanical medial plane between the ends of the two pole-pieces.

11. In an alternating current motor, a stator core including a bar-like portion of rectangular section provided with a cylindrical perforation the diameter of which is approximately seven-eighths of the width of the bar portion through which the perforation extends; the said bar-like portion being provided with slots extending parallel to the bar faces which are parallel to the axis of the said perforation, the said slots leading from diametrically opposite portions of the perforation and each slot being at least three times as far from one of the said parallel bar faces as from the other of the said faces; and shading coils respectively extending through the two slots; each shading coil surrounding the portion of the cross-bar between such a slot and the one of the said parallel bar faces which is nearest to that slot, and the said bar-like portion being provided adjacent to each of the said parallel bar faces with a pair of reluctance gaps, each pair of which gaps is symmetrical with respect to a plane diametric of the said perforation and at right angles to the said parallel bar faces.

JAMES J. GOUGH.